Patented Nov. 20, 1923.

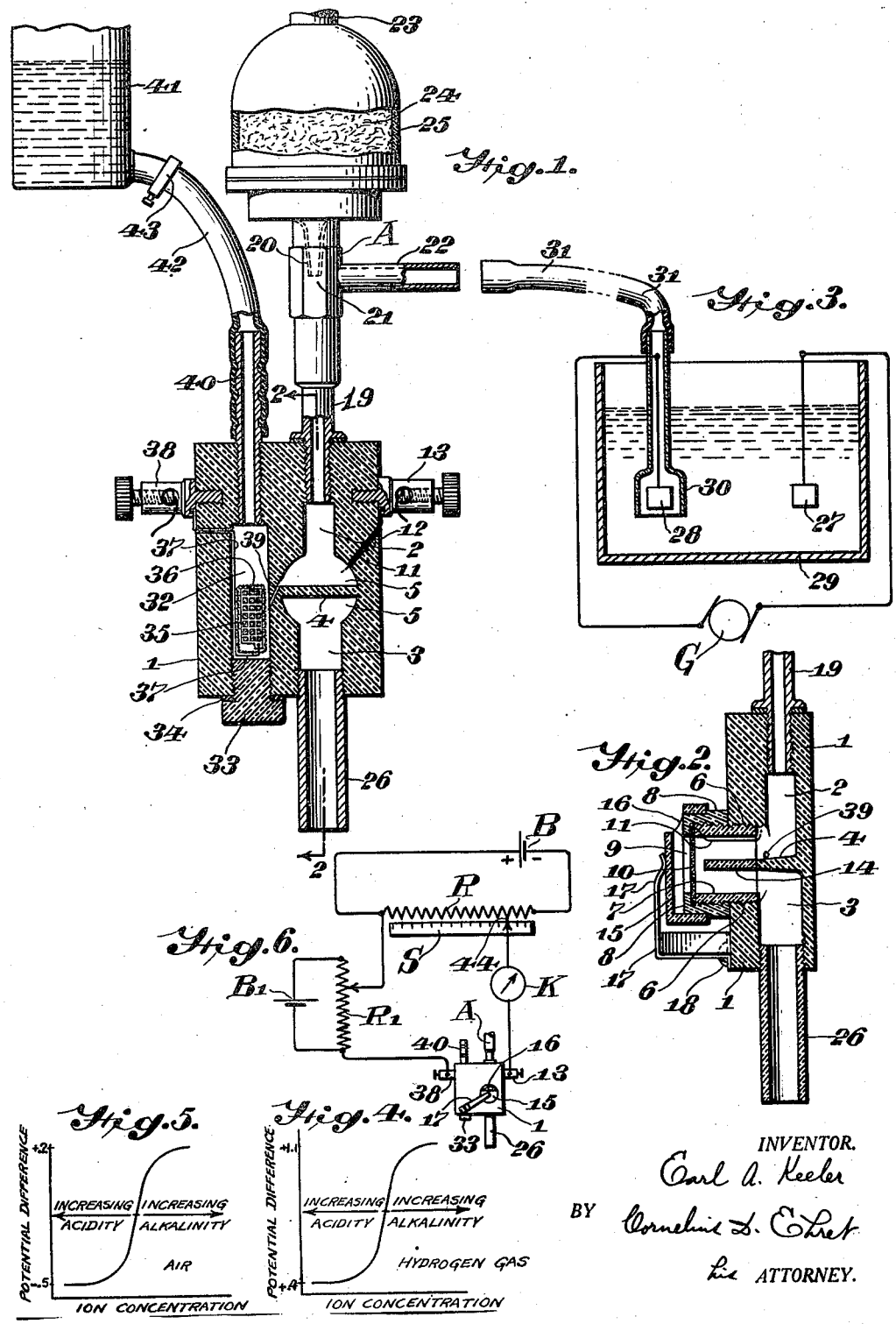

1,474,594

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

METHOD OF AND APPARATUS FOR OBTAINING ION CONCENTRATION EFFECTS.

Application filed May 1, 1922. Serial No. 557,597.

*To all whom it may concern:*

Be it known that I, EARL A. KEELER, a citizen of the United States, residing in Norristown, county of Montgomery, State of Pennsylvania, have invented certain new and useful Improvements in Methods of and Apparatus for Obtaining Ion Concentration Effects, of which the following is a specification.

My invention relates to a method of and apparatus for obtaining electrical effects by the co-action of electrodes with an electrolyte, for any suitable purpose, and, among others, though not exclusively, for the utilization or determination of ion concentration effects.

In accordance with my invention, the gas, for a gas electrode, is brought into mixture with the electrolyte and the mixture brought into contact with the electrode.

Further in accordance with my invention, the mixture of electrolyte and gas flows in a stream past and in contact with the electrode.

Further in accordance with my invention, either the gas or electrolyte solution is employed as a motive fluid for entraining the other or operating upon it upon the principle of aspiration, to cause their mixture in a stream which passes and contacts with the electrode.

Further in accordance with my invention, air is employed as the gas or gas electrode, in the utilization or determination of ion concentration, as degrees of alkalinity or acidity; and it is a feature of my invention that air is so employed as a gas in relations where formerly hydrogen was commonly employed, the utilization of air in many relations saving the expense and inconvenience of providing a source of hydrogen or other gas.

My invention resides in the method and structure hereinafter described and claimed.

For an illustration of one of numerous forms my invention may take, reference is to be had to the accompanying drawings, in which:

Fig. 1 is a vertical sectional view, partly in elevation, of structure embodying my invention and utilizable in practicing my method.

Fig. 2 is a section on the line 2—2 of Fig. 1.

Fig. 3 is a generic representation of apparatus for producing a desired gas by electrolysis.

Fig. 4 is a graphic representation of relations between potential differences and ion concentration as regards changes of alkalinity and acidity when a hydrogen electrode is employed.

Fig. 5 is a similar characteristic relating to the employment of an air electrode under similar circumstances.

Fig. 6 is a diagrammatic view of one of many modes of utilizing my apparatus, together with means for compensating or correcting for change in nature of gas for the gas electrode.

Referring to Figs. 1 and 2, 1 is a block or mass of insulating material of any suitable nature, as hard rubber, molded condensite, bakelite or the like. Within it are formed the passages 2 and 3 between which is disposed a barrier or baffle 4 in an enlargement or chamber 5 which communicates with the threaded aperture 6 into which is threaded the tube or nipple 7 of insulating material, and upon which is threaded the member 8, preferably of insulating material, and having the aperture 9. Between the flange of the member 8 and the end of the tube 7 is clamped a perforated or gauze electrode 10 of platinum or any other suitable material. A platinum or other suitable conductor or wire 11 connects with the electrode 10 and extends through a hole 12 in the block 1 to the exterior thereof, where it connects with the binding post 13 carried by the block 1.

Within the tube 7 is disposed in register with the baffle 4 the barrier or baffle plate 14, preferably terminating short of the electrode 10. Upon the clamping cap 8 fits the circular cap member 15, cut away at 16 so that the interior of the cap is open to the atmosphere, the cap structure 15 forming in effect a dam over whose edge 16 electrolyte may flow as hereinafter described. The cap 15 is retained in position by the spring clamp 17, pivoted upon a screw 18 carried by the block 1. By swinging the clamp 17 to one side the cap 15 may be removed and thereafter the cap or clamping member 8, allowing access to or removal of the electrode 10, or after removal of the electrode 10 allowing removal of the baffle or barrier plate 14.

Communicating with the passage 2 is the discharge pipe 19 of an aspirator A, of any suitable or convenient form. The aspirator is here indicated generically as comprising the nozzle structure 20 projecting into the suction chamber 21, with which communicates the suction pipe 22, which, as indicated, may be open to the air, when air is the gas to be employed in co-action with the electrode 10.

The electrolyte solution is introduced through the pipe 23, under any suitable pressure or head, for example, a head of eight to ten feet. It then traverses the glass wool or other filter medium 24 in the filter chamber 25, if filtration is suitable or desirable. The electrolyte then passes through the nozzle 20 and entrains air or other gas entering the suction chamber 21 through the pipe 22, and the mixture of electrolyte and gas passes downwardly through the pipe 19 into the passage 2 around the baffles 4, 14 into contact with the electrode 10, thence into the chamber 3, and is discharged through the discharge pipe 26. Some of the electrolyte passes through the electrode 10 into the dam formed by the cap 15, which stands in the dam or overflows its edge 16, according to the rapidity of flow of the mixture of electrolyte and gas, the overflow edge 16 preferably being somewhat higher than the uppermost limit of the aperture 9 in the member 8, whereby the entire electrode 10 will be in effect submerged in the stream of electrolyte and gas, the structure described affording means for bringing the gas effectively into contact with both sides of the electrode 10.

While I have described air as the gas entering through the suction pipe 20 into mixture with the electrolyte delivered by the nozzle 20, it will be understood that any other gas may be employed, as hydrogen, chlorine, or any gas suitable to the nature of the determinations or utilization of ion concentration involved.

Any suitable source of such gas may be provided, as, for example, a tank of gas under pressure and connected through the needle or throttling valve to the pipe 22.

Where it is desired, however, to produce the gas at the place of consumption, apparatus such as shown in Fig. 3 may be employed, whereof G is a direct current generator connected to the platinum or other suitable electrodes 27 and 28 immersed in suitable electrolyte in the container 29. If hydrogen gas is desired, the electrolyte may be acidulated water, and the direction of current between the electrodes 27 and 28 is such that hydrogen is liberated at the electrode 28 within the bell 30, from which it passes off through the tube 31, which may be connected to the aspirator suction tube 22. In case oxygen is required, the direction of current between electrodes 27 and 28 may be reversed, in which case oxygen will be generated at electrode 28 and delivered to the tube 21 at aspirator A.

In industrial plants, where the electrolyte delivered through the pipe 23 is raw or other water to be utilized within the plant for chemical or other processes or for boiler feed purposes, air may to great advantage be employed as the gas for mixture with the water or electrolyte to contact with the electrode 10. However, in such an industrial plant hydrogen or other gas, if preferred, may be cheaply produced without recourse to a tank of hydrogen or other gas under pressure, by apparatus such as indicated in Fig. 3, the generator G of which may be readily driven by any suitable source of power about the plant, the amount of power required for the production of hydrogen or other gas being relatively inconsequential.

While I have described the employment of a liquid or electrolyte solution as passing through the nozzle structure 20 of the aspirator A, it will be understood that the gas to be brought into contact with the electrode 10 may be delivered through the nozzle structure 20 under suitable pressure, in which case the electrolyte will be drawn in through the tube 22 and entrained by the gas jet and mixed therewith, with the result as before, to wit, a stream consisting of a mixture of gas and electrolyte passing in contact with the electrode 10.

It will therefore be understood that either the electrolyte or the gas may be the motive fluid of the aspirator, and either the gas or electrolyte may be the material entrained.

Only the gas electrode has thus far been described; the other electrode, generally a calomel electrode or half cell, may be provided in any suitable way. In the example illustrated, the block 1 is provided with a chamber or passage 32 accessible upon removal of the threaded plug 33, preferably provided with a gasket 34. Within the chamber 32 is disposed the grid 35, for example, of platinum wire gauze having applied thereto a suitable paste confined by a wrapping or bag 36 of silk or other suitable fabric or pervious material. Connected to the grid 35 is the platinum or other suitable conductor 37 extending through a hole in the block 1 and connected to the binding post 38. A passage 39 connects the chamber 5 with the chamber 32. This passage is preferably of capillary or small diameter, for example, of the order of two one-hundredths of an inch, though it will be understood that any other suitable diameter may be employed.

With the chamber 32 communicates the pipe 40, to which a suitable solution, as, for example, a tenth normal solution of potassium chloride, is delivered from the storage vessel 41 through the flexible tube 42 controlled by the pinch cock 43.

The solution from the reservoir 41 passes into the chamber 32 into contact with the grid 35 and its paste, and flows in small quantities through the passage 39 into the chamber 5 into mixture with the electrolyte flowing through the passages 2 and 3.

There is accordingly formed a primary cell one of whose electrodes is the gas electrode 10, and whose other electrode is the paste or a component thereof held by the grid 35.

Ordinarily, and generally for hydrogen ion determinations or for the determinations of acidity or alkalinity, the paste for the grid 35 may be mercury, water and calomel (monochloride of mercury) beaten or otherwise suitably worked together.

The nature of the material of the electrode 10 is suited to the conditions under which employed, or is so chosen as to be adapted to the nature of the particular ion or ions involved. Ordinarily, the electrode 10 may be of platinum or gold, and is usually covered with platinum black or the black of iridium, palladium or the like. When hydrogen ion concentration is involved, hydrogen gas may be delivered in mixture with the electrolyte, or, as aforesaid, and preferably under certain conditions, ordinary air is employed in place of hydrogen. When the concentration of other than hydrogen ions is involved, the negative electrode 10, instead of being a hydrogen or air electrode, will be suitably different. For example, if concentration of chlorine ions is involved, chlorine gas may be delivered in mixture with the electrolyte.

It will therefore be understood that my invention is not limited, as to either the positive or negative electrode, to the particular materials described, it being within the skill of the art to vary the coatings, fluids, liquids and gases employed to adapt the electrode structures to the particular conditions or circumstances under which they are to be employed.

By the method and apparatus described, the amount of gas brought into contact with the electrode 10 varies with rate of flow of the electrolyte through the pipe 19 and passage 2, an increase of rate or flow bringing within a certain time greater quantities of gas into contact with the electrode 10. In this respect my apparatus and method are distinguished from prior practice wherein a movement or current of the electrolyte tends to carry the gas away from the electrode and thereby decrease the effectiveness of the gas electrode. Furthermore, by my method and apparatus, all of the gas is applied at the surface of the electrode, thereby reducing the gas consumption, which makes it possible to employ a small electrolytic generator to produce the gas, as described in connection with Fig. 3.

My method and apparatus are particularly adaptable to the continuous measurement or utilization of variations in the ion concentration of flowing solutions or electrolytes. For example, the electrolyte may be the water of a municipal or industrial supply; by connecting the aspirator A to a faucet or pipe traversed by the water supply, and entraining air or other suitable gas through the pipe 22, the complete cell will continuously produce and electro-motive-force whose magnitude varies with changes in magnitude of ion concentration in the electrolyte, and this varying electro-motive-force may be continuously or intermittently measured, or continuously recorded; or such varying electro-motive-force may be employed, as through the instrumentality of the hereinafter described galvanometer, to control any suitable control apparatus, as, for example, such apparatus as described in my prior application Serial No. 374,267, filed April 16, 1920.

Referring to Fig. 6, a simple potentiometer arrangement is indicated for employment of the cell described. In circuit with the battery B is a resistance R, in shunt to a variable portion of which are connected the galvanometer K and the cell. For example, the binding post 13 may be connected through the galvanometer K to the rider or contract 44 slidable along the resistance R and over the scale S, which may be calibrated in any suitable units, as those of ion concentration, $P_H$ value, acidity, alkalinity, electro-motive-force, etc. The binding post 38, for the simplest case, will be connected directly to one terminal of the resistance R by ommission of the resistance $R^1$ and battery $B^1$. For example, if measurements of determinations of hydrogen ion concentrations are involved and hydrogen gas is employed with the electrode 10, the scale S may be read directly in terms of $P_H$ values or hydrogen ion concentrations, the scale S being determined from the characteristic of Fig. 4, in which ordinates are potential differences and abscissæ ion concentrations, when a hydrogen electrode is employed. The contact 44 is moved along the resistance R to such position that the deflection of the galvanometer K is nil; the correct reading then appears directly beneath the contact 44 upon the scale S.

In Fig. 5 is indicated a characteristic similar to that of Fig. 4, where, however, air is employed in lieu of hydrogen. The electro-motive-force range of the characteristic is substantially the same as that for hydrogen gas, but the upper and lower limits are different absolute potentials. If it be desired to utilize the apparatus of Fig. 6, previously calibrated for a hydrogen electrode, for example, suitable correction may be introduced for the employment of air by connecting at any suitable point in the circuit of the galvanometer K the resistance $R^1$ traversed by current from the battery $B^1$, the magnitude of the resistance $R^1$ included in the galvanometer circuit being so chosen that the fall of potential across such portion of the resistance $R^1$ suitably corrects or compensates for the change from hydrogen gas to air. While the amount of the resistance $R^1$ in the galvanometer circuit is shown as variable, it will be understood that it may be fixed after having once been properly determined.

In determining the acidity of water, the employment of air in mixture with water has proved satisfactory, the air apparently behaving as an oxygen electrode.

While I have referred to the employment of a single gas mixture with the electrolyte, it will be understood that a mixture of gases in mixture with the electrolyte may be employed; and that of the mixture of gases, one or more of them may be neutral in the sense that it is ineffective as regards the electro-motive-force produced by the electrodes or primary cell. For example, in employing air there is in fact employed a mixture of oxygen with nitrogen, oxygen being the active or effective gas while nitrogen is merely neutral and a diluent.

What I claim is:

1. The method of maintaining a gas electrode for producing an effect dependent upon the concentration of an ion of an electrolyte, which consists in mixing with the electrolyte the concentration of an ion whereof is involved a gas suited to the ion whose concentration is involved, and passing the mixture in contact with an electrode.

2. The method of maintaining a gas electrode for producing an effect dependent upon the concentration of an ion of an electrolyte, which consists in mixing with the electrolyte the concentration of an ion whereof is involved a gas suited to the ion whose concentration is involved, and continuously flowing the mixture in contact with a solid electrode.

3. The method of maintaining a gas electrode for producing an effect dependent upon the concentration of an ion of an electrolyte, which consists in mixing with the electrolyte the concentration of an ion whereof is involved a gas suited to the ion whose concentration is involved, and flowing the mixture through an electrode.

4. The method of maintaining a gas electrode for producing an effect dependent upon the concentration of an ion of an electrolyte, which consists in mixing with the electrolyte the concentration of an ion whereof is involved a gas suited to the ion whose concentration is involved and a diluting gas, and passing the mixture in contact with an electrode.

5. The method of effecting contact of an electrode, gas and an electrolyte, which consists in bringing the gas and electrolyte into mixture with each other by employing one of them as a motive fluid which entrains the other, and passing the mixture in contact with the electrode.

6. The method of effecting contact between an electrode and gas and an electrolyte, which consists in employing the electrolyte as a motive fluid, entraining the gas thereby, and passing the mixture in contact with the electrode.

7. The method of effecting contact between an electrode, gas and an electrolyte, which consists in generating the gas, utilizing the electrolyte as a motive fluid to entrain the gas as it is generated, and passing the mixture in contact with the electrode.

8. Gas electrode structure comprising an electrode, and means for passing in contact with said electrode a mixture of electrolyte and gas.

9. Gas electrode structure comprising an electrode, means for producing a current of electrolyte in contact with said electrode, and means for introducing gas into the electrolyte current.

10. Gas electrode structure comprising sources of gas and electrolyte, an aspirator employing one of them as motive fluid and entraining the other, and an electrode disposed in the discharge of said aspirator.

11. Gas electrode structure comprising a source of electrolyte under pressure, an aspirator employing said electrolyte as motive fluid, means delivering gas into said aspirator for mixture with said electrolyte, and an electrode in the discharge from said aspirator.

12. Apparatus for maintaining a gas electrode comprising a gas generator, means for mixing the gas as generated with an electrolyte, an electrode, and means for passing the mixture of gas and electrolyte in contact with said electrode.

13. The combination with a source of electrolyte, of a gas generator, an aspirator for bringing the electrolyte and gas from said generator into mixture with each other, and an electrode disposed in the discharge of said aspirator.

14. The combination with a source of electrolyte under pressure, of an aspirator employing said electrolyte as motive fluid, a gas generator connected with the suction of said aspirator, and an electrode disposed in the discharge from said aspirator.

15. The combination with a source of electrolyte under pressure, of an aspirator employing said electrolyte as motive fluid, an electrolytic gas generator delivering gas to the suction of said aspirator, and an electrode disposed in the discharge of said aspirator.

16. The combination with a member having a passage through which electrolyte and gas are conducted in mixture with each other, of a perforated electrode through which said mixture passes.

17. The combination with a member having a passage through which electrolyte and gas are conducted in mixture with each other of a perforated electrode one side of which is in communication with said passage, and a liquid-retaining dam on the opposite side of said electrode.

18. The combination with a member having a passage through which electrolyte and gas are conducted in mixture with each other, of baffle structure in said passage deflecting the mixture laterally, a perforated electrode adjacent said baffle structure, and a liquid-retaining dam on the side of said electrode opposite said baffle structure.

19. The combination with a member having a fluid passage, of a member forming a lateral passage, a perforated electrode disposed upon said second member, and a dam-forming member carried by said second member adjacent said electrode.

20. The combination with a member having a fluid passage, of a member forming a lateral passage, a perforated electrode disposed upon said second member, a dam-forming member carried by said second member adjacent said electrode, and baffle structure extending across said passage into said second named member.

21. The combination with a member having a fluid passage, of a member forming a lateral passage, a perforated electrode disposed upon said second member, a dam-forming member carried by said second member adjacent said electrode, and baffle structure extending across said passage into said second named member, said baffle structure comprising registering members one of which is disposed in said second member and removable therefrom.

22. The combination with a member having a passage for conducting a mixture of electrolyte and gas, an electrode with which said mixture contacts, a chamber in said member, a second electrode therein, and a fluid passage connecting said first named passage with said chamber.

23. The combination with a member having a passage for conducting a mixture of electrolyte and gas, an electrode with which said mixture contacts, a chamber in said member, a second electrode therein, and a capillary passage connecting said first named passage with said chamber.

24. The combination with a member having a plurality of chambers, a passage connecting said chambers, an electrode in one of said chambers, means for conducting fluid past said electrode through said passage into another of said chambers, and a gas electrode in communication with said other chamber.

25. A gas electrode comprising the combination with an electrode, of means for mixing air and electrolyte, and means for passing the mixture in contact with said electrode.

26. A gas electrode comprising the combination with an electrode, of means for mixing an electrolyte with oxygen diluted with another gas, and means for passing the mixture in contact with said electrode.

27. In the art of determining or utilizing variations of ion concentration, the method which consists in mixing an electrolyte the ion concentration whereof is involved with a gas, passing the mixture in contact with an electrode, and producing a difference of potential between said electrode and a second electrode in contact with said electrolyte.

28. In the art of determining or utilizing variations of ion concentration, the method which consists in mixing an electrolyte the ion concentration whereof is involved with air, passing the mixture of electrolyte and air in contact with an electrode, and producing a difference of potential between said electrode and a second electrode in contact with said electrolyte.

29. In the art of determining or utilizing variations of ion concentration, the method which consists in mixing an electrolyte the ion concentration whereof is involved with air, passing the mixture of electrolyte and air in contact with an electrode, and producing a difference of potential between said electrode and a calomel electrode in contact with said electrolyte.

30. The method of determining variations of ion concentration of a water supply, which consists in employing water from said supply as a motive fluid, entraining thereby a gas, and continuously flowing the mixture in contact with an electrode, and producing a potential difference between said electrode and a second electrode co-acting with the water.

31. The method of determining variations of ion concentration of a water supply, which consists in employing water from said supply as a motive fluid, entraining thereby air, continuously flowing the mixture in contact with an electrode, and producing a potential difference between said electrode and a second electrode co-acting with the water.

32. The combination with a cell having a gas electrode, of a circuit with which said cell is related, and electrical means in said circuit for compensating for a change in the nature of the gas of said electrode.

33. The combination with a cell having a gas electrode, of a potentiometer circuit with which said cell is related, and means for compensating said circuit for a change in the nature of the gas of said electrode.

34. The combination with a cell having a gas electrode, of a circuit with which said cell is related, an associated scale having markings corresponding with a gas of predetermined character, and means for compensating said circuit for change to a gas of different character.

In testimony whereof I have hereunto affixed my signature this 28" day of April, 1922.

EARL A. KEELER.